(12) United States Patent
Persson et al.

(10) Patent No.: US 10,981,198 B2
(45) Date of Patent: Apr. 20, 2021

(54) HAMMERLESS SOLUTION

(71) Applicant: Metso Sweden AB, Trelleborg (SE)

(72) Inventors: Mathias Persson, Trelleborg (SE); Peter Lundberg, Claremont (AU)

(73) Assignee: Metso Sweden AB, Trelleborg (SE)

(*) Notice: Subject to any disclaimer, the term of this patent is extended or adjusted under 35 U.S.C. 154(b) by 178 days.

(21) Appl. No.: 16/333,054

(22) PCT Filed: Sep. 15, 2017

(86) PCT No.: PCT/EP2017/073318
§ 371 (c)(1),
(2) Date: Mar. 13, 2019

(87) PCT Pub. No.: WO2018/050842
PCT Pub. Date: Mar. 22, 2018

(65) Prior Publication Data
US 2019/0224721 A1  Jul. 25, 2019

(30) Foreign Application Priority Data

Sep. 16, 2016  (EP) .................................. 16189247

(51) Int. Cl.
*F16B 5/02* (2006.01)
*B07B 1/46* (2006.01)
(Continued)

(52) U.S. Cl.
CPC ............ *B07B 1/4645* (2013.01); *B25B 13/48* (2013.01); *B25B 13/50* (2013.01); *F16B 5/02* (2013.01);
(Continued)

(58) Field of Classification Search
CPC ... B07B 1/4645; B07B 2201/02; B25B 13/48; B25B 13/50; F16B 5/02; F16B 5/0241;
(Continued)

(56) References Cited

U.S. PATENT DOCUMENTS 3,354,757 A * 11/1967 Grimm .................. B25B 13/04
                                                                81/176.1
4,909,929 A *  3/1990 Tabor .................. B01D 25/002
                                                                209/400
(Continued)

FOREIGN PATENT DOCUMENTS

GB          593 440 A       10/1947
GB          593440          10/1947
(Continued)

OTHER PUBLICATIONS

International Search Report and Written Opinion for International Application No. PCT/EP2017/0733218 dated Dec. 12, 2017.
(Continued)

*Primary Examiner* — Patrick H Mackey
(74) *Attorney, Agent, or Firm* — Andrus Intellectual Property Law, LLP

(57) ABSTRACT

The invention relates to a screen, which has a screen panel support and screening modules arranged in the screen panel support. The screening modules are fastened to the screen panel support by means of at least one device. The device comprises a first element attachable to the screen panel support and adapted to receive a opening of the screening module or an opening created by adjacent screening modules, the first element having an outer threading, and a second element having an inner threading for engagement with the outer threading of the first element, such that the screening module is attached to the screen panel support upon interconnection between the first element and the second element. The screen is characterized in that an outer periphery of the second element comprises at least one groove for engagement with a handling tool. The invention also relates to a method for fastening a screening module to a screen panel support.

15 Claims, 7 Drawing Sheets

(51) Int. Cl.
    *F16B 37/12*     (2006.01)
    *F16B 23/00*     (2006.01)
    *F16B 33/00*     (2006.01)
    *B25B 13/48*     (2006.01)
    *B25B 13/50*     (2006.01)

(52) U.S. Cl.
    CPC ........ *F16B 5/0241* (2013.01); *F16B 23/0061* (2013.01); *F16B 33/006* (2013.01); *F16B 37/125* (2013.01); *B07B 2201/02* (2013.01)

(58) Field of Classification Search
    CPC ... F16B 23/0061; F16B 33/006; F16B 37/125
    See application file for complete search history.

(56) References Cited

U.S. PATENT DOCUMENTS

| | | | | |
|---|---|---|---|---|
| 5,213,217 | A * | 5/1993 | Galton | B07B 1/4645 209/399 |
| 5,699,918 | A * | 12/1997 | Dunn | B07B 1/4645 209/397 |
| 6,206,200 | B1 * | 3/2001 | Gilles | F16B 19/1081 209/399 |
| 7,604,127 | B2 * | 10/2009 | Freissle | B07B 1/46 209/412 |
| 7,946,428 | B1 * | 5/2011 | Lane | B07B 1/4645 209/399 |
| 8,025,154 | B2 * | 9/2011 | Kriel | B07B 1/4645 209/405 |
| 8,123,043 | B2 * | 2/2012 | McGregor | B07B 1/4645 209/405 |
| 8,720,697 | B2 * | 5/2014 | Pryde | B07B 1/4645 209/455 |
| 9,795,992 | B2 * | 10/2017 | Woodgate | B07B 1/46 |
| 2005/0040083 | A1 | 2/2005 | Freissle et al. | |

FOREIGN PATENT DOCUMENTS

| | | |
|---|---|---|
| RU | 65792 | 8/2007 |
| SU | 1569452 | 6/1990 |
| WO | 0043134 | 7/2000 |
| WO | 0053343 | 9/2000 |
| WO | 0053343 A1 | 9/2000 |
| WO | 2004043652 A2 | 5/2004 |
| WO | 2010028442 | 3/2010 |
| WO | 2010028442 A1 | 3/2010 |
| WO | 2018050845 A1 | 3/2018 |

OTHER PUBLICATIONS

International Report on Patentability for International Application No. PCT/EP2017/073318 dated Aug. 28, 2018.
Office Action issued in corresponding Chilean Application No. 680-2019 dated Jan. 9, 2020.
Extended European Search Report for European Patent Application No. 16189247.6 dated Mar. 28, 2017.
Acceptance Decision for corresponding Russian Patent Application No. 2019109087/03, dated Dec. 1, 2020.
Extended European Search Report for corresponding European Patent Application No. 20202921.1 dated Feb. 1, 2021.
Office Action for corresponding Indonesian Patent Application No. PID201903041 dated Dec. 18, 2020.

* cited by examiner

HAMMERLESS SOLUTION

CROSS-REFERENCE TO RELATED APPLICATIONS

This application claims priority to PCT/EP2017/073318, filed Sep. 15, 2017, and published in English on Mar. 22, 2018 as publication number WO 2018/050842, which claims priority to European Application No. 16189247.6, filed Sep. 16, 2016, incorporated herein by reference.

TECHNICAL FIELD

The invention relates to a method for fastening a screening module to a screen panel support of a screen, and such a screen.

BACKGROUND ART

The modern screens used today for screening of media normally comprises a screen panel support and screening modules which are arranged in the screen panel support. These screens have several advantages compared with those of earlier generations since individual screening modules can be exchanged when worn out.

The screening modules should have an active surface that is as large as possible. The active surface is normally limited by the rigidity of the screening module since a screening module of lower strength requires supporting sections arranged at shorter intervals, which results in an increased dead surface of the screening module. Nevertheless, letting the entire screening surface consist of a single screening module and reducing the number of supporting points to a minimum does not constitute a convenient alternative. Such a method would certainly provide a maximum surface, but at the price of very high operating expenses since it would be necessary to exchange the entire screen deck also in case of local wear. Consequently, it is desirable to have a screen with a large active surface and high stability, on which it would be easy to exchange individual screening modules.

Since the screens of the type above are subjected to substantial forces during use, the screening modules must be locked in place to the frame to prevent them from becoming loose. A conventional way of achieving this is by using a hammer to knock down a locking element, such as a pin, into some sort of a sleeve provided in the frame.

A problem with the fastening method above is that it requires a substantive amount of force and that the maintenance personnel is exposed to high risk of injury when attaching the screening modules. The same applies when old, worn out elements must be replaced. With that known method it is necessary to use crowbars or similar in order to pull the pin out of the sleeve. This work also involves high forces and many situations in which personnel are subjected to risk of occupational injuries.

SUMMARY OF THE INVENTION

It is an objective of the present invention to provide an improvement of the above technique and prior art. More particularly, it is an objective of this invention to provide an improved screen and a method for easy fastening of a screening module to a screen panel support in a safe and reliable manner. It is also an objective of this invention to provide an improved screen and a method for easy disassembly of screening modules from a screen panel support in a safe and reliable manner.

According to a first aspect, these and other objects, and/or advantages that will be apparent from the following description of embodiments, are achieved, in full or at least in part, by a screen, which has a screen panel support and screening modules arranged in the screen panel support. The screening modules are fastened to the screen panel support by means of at least one device. The device comprises a first element being attachable to the screen panel support and adapted to receive an opening of the screening module or an opening created by adjacent screening modules. The opening extends through said screening module or adjacent screening modules. The device further comprises a second element for engagement with the first element, such that the screening module can be attached to the screen panel support upon interconnection between the first element and the second element. The screen is further distinguished in that an outer periphery of the second element comprises a plurality of grooves for engagement with a handling tool. This is advantageous in that the most hazardous stage of the fastening process will be removed. There is no longer a need to use a hammer in order to force the individual screening modules in place. Instead, a screwing tool is used to fasten the screening modules to the screen panel support by engaging the first element with the second element.

The plurality of grooves may extend in an axial direction and along the entire length of the second element. Alternately, the grooves may extend in an axial direction and along a limited portion of the length of the second element. It is preferred that the groove extends along substantially the entire length of the second element starting from its upper portion. This is due to the fact that the handling tool engages with the upper portion of the second element and thus the groove must be accessible from above. Also, the second element will be worn down in accordance with the upper surface of the screening modules subjected to the material that is being screened. For that reason, it is advantageous that the groove has a substantial axial extension in order to avoid being completely worn off.

The first element may be hollow and adapted to receive a bolt for attachment to the screen panel support by means of the bolt and a nut. Since the first element is attached to the rails of the frame prior to the screening modules, personnel will have unrestricted access to the underside of the rails. This is not the case when the screening modules are in place.

In a preferred embodiment of the invention, the first element and/or said second element may be annular. Further, the first element may be manufactured by a material chosen from the group consisting of ceramic material, steel, or rigid plastic, and the second element may be manufactured by a thermoplastic material or a polyurethane. Preferably the materials of the first and the second elements are in any case chosen such that the material of the second element is softer and/or more elastic than that of the first element.

Each screening module may have at least one apertured section. The apertured section has a first surface intended to receive and carry material to be screened, a second surface opposite the first surface, apertures extending from the first surface to the second surface, and a circumferential surface.

Each screening module may comprise at least one opening for receiving the device for fastening the screening module. The opening has a first circumference along one portion of its axial direction and a second circumference along another portion of its axial direction. The second circumference is smaller than the first circumference.

In another embodiment of the invention, the circumferential surfaces of adjacent screening modules have shapes that creates the at least one opening.

The portion of the at least one opening with the first circumference may be adapted to receive the first element and the second element, and the portion of the at least one opening with the second circumference is adapted to receive the first element only. Thus, an inner periphery of the at least one opening may be said to comprise a protrusion, such as a flange or protruding tongue, for engagement with the second element. In the case of an opening being created by shapes in two or more adjacent screening modules, it is apparent that each screening module may comprise a partial flange, such as a semi-flange or a protruding part which together may form a flange or protruding tongue.

According to a second aspect, these and other objects are achieved, in full or at least in part, by a method for fastening screening modules to a screen panel support. The method comprises attaching a first element to the screen panel support, placing an opening of a screening module or an opening created by adjacent screening modules around the first element, the opening having a first circumference along one portion and a second circumference along another portion of its axial direction, the opening extending through said screening module or adjacent screening modules, and engaging a second element with the first element, the second element having a larger outer circumference than the second circumference of the opening, thereby attaching the screening module or screening modules to the screen panel support.

The step of engaging the second element with the first element comprises engaging a handling tool with a plurality of grooves provided on an outer periphery of the second element, and creating a rotating motion of the second element.

Effects and features of the second embodiment of the present invention are largely analogous to those described above in connection with the first aspect of the inventive concept. Embodiments mentioned in relation to the first aspect of the present invention are largely compatible with the second aspect of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figure 1A:
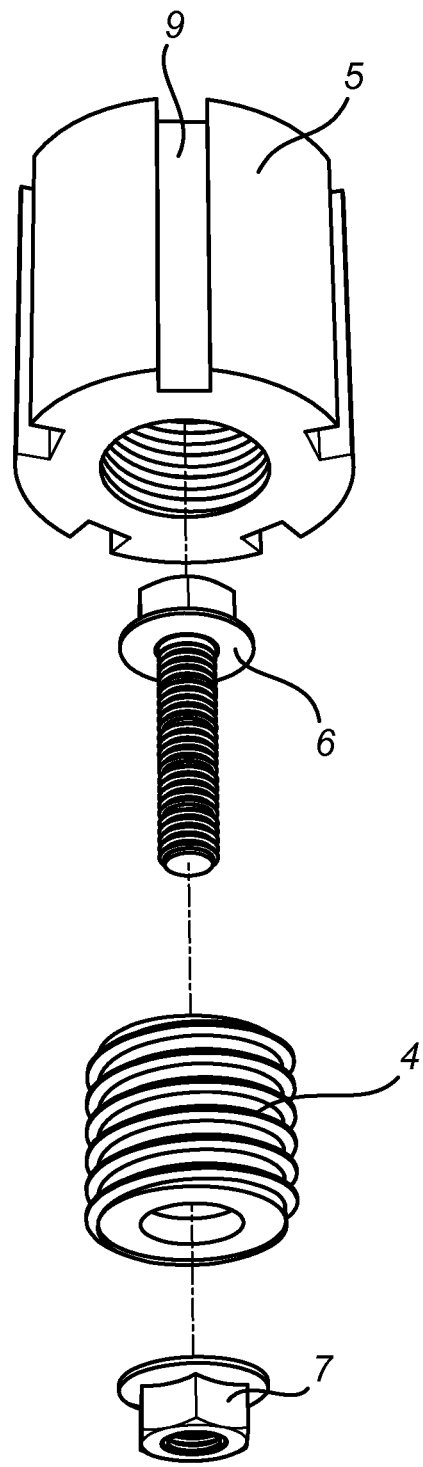
FIGS. 1a and 1b are perspective views of a device used to fasten screen elements to a screen panel support in a screen according to one embodiment of the invention.
Figure 1B:
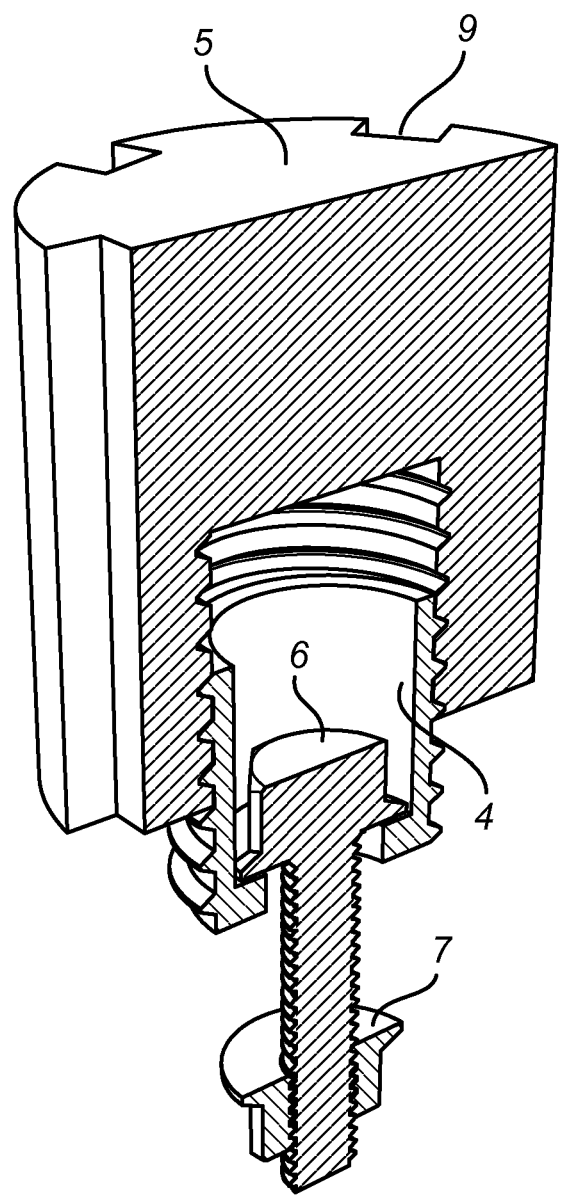
Figure 3A:
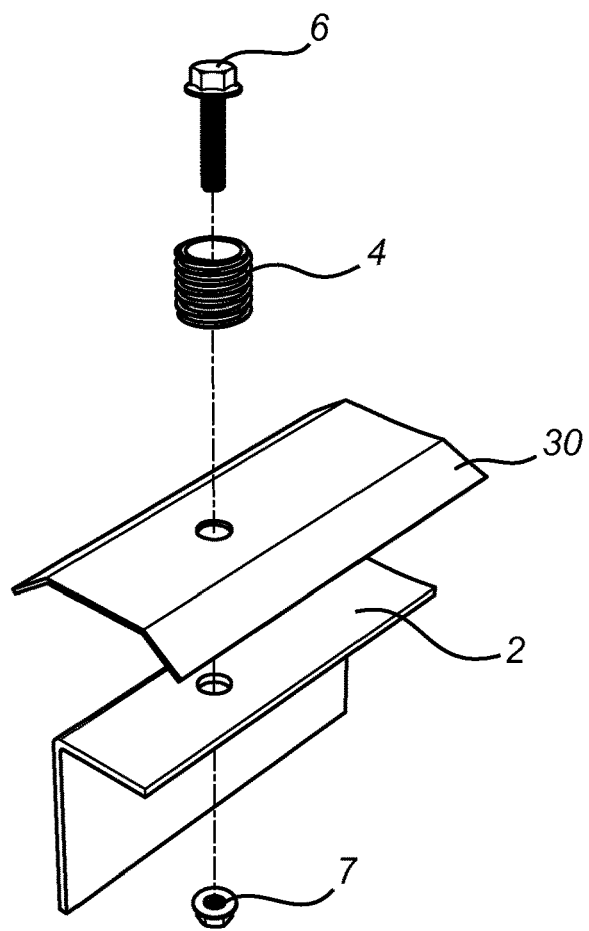
FIG. 3a-3d illustrates a sequence of steps of a fastening method according to one exemplary embodiment of the invention.
Figure 3B:
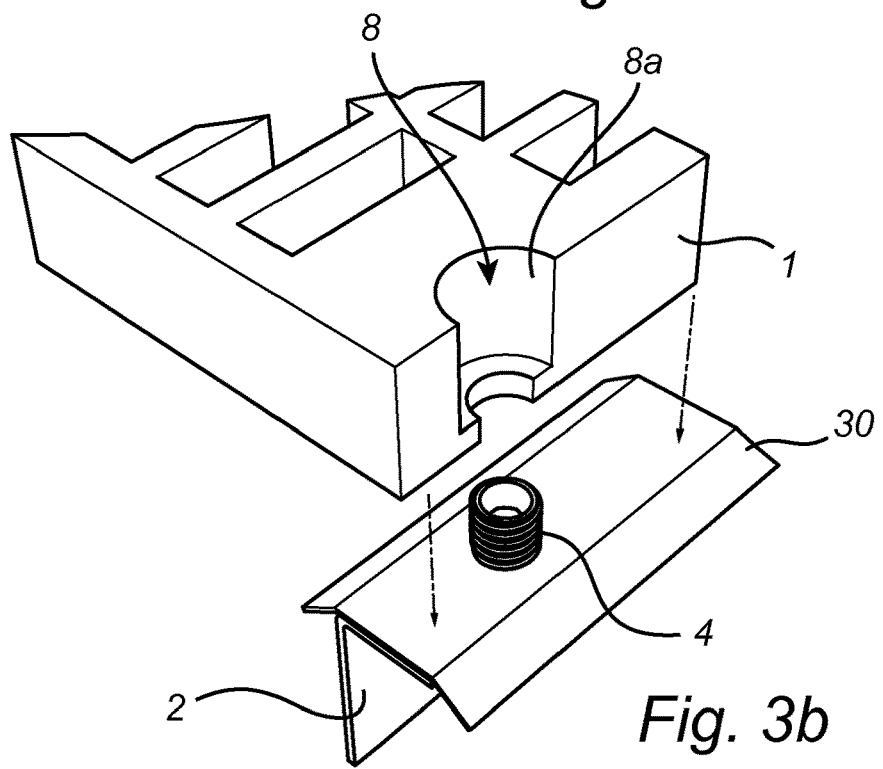
Figure 3C:
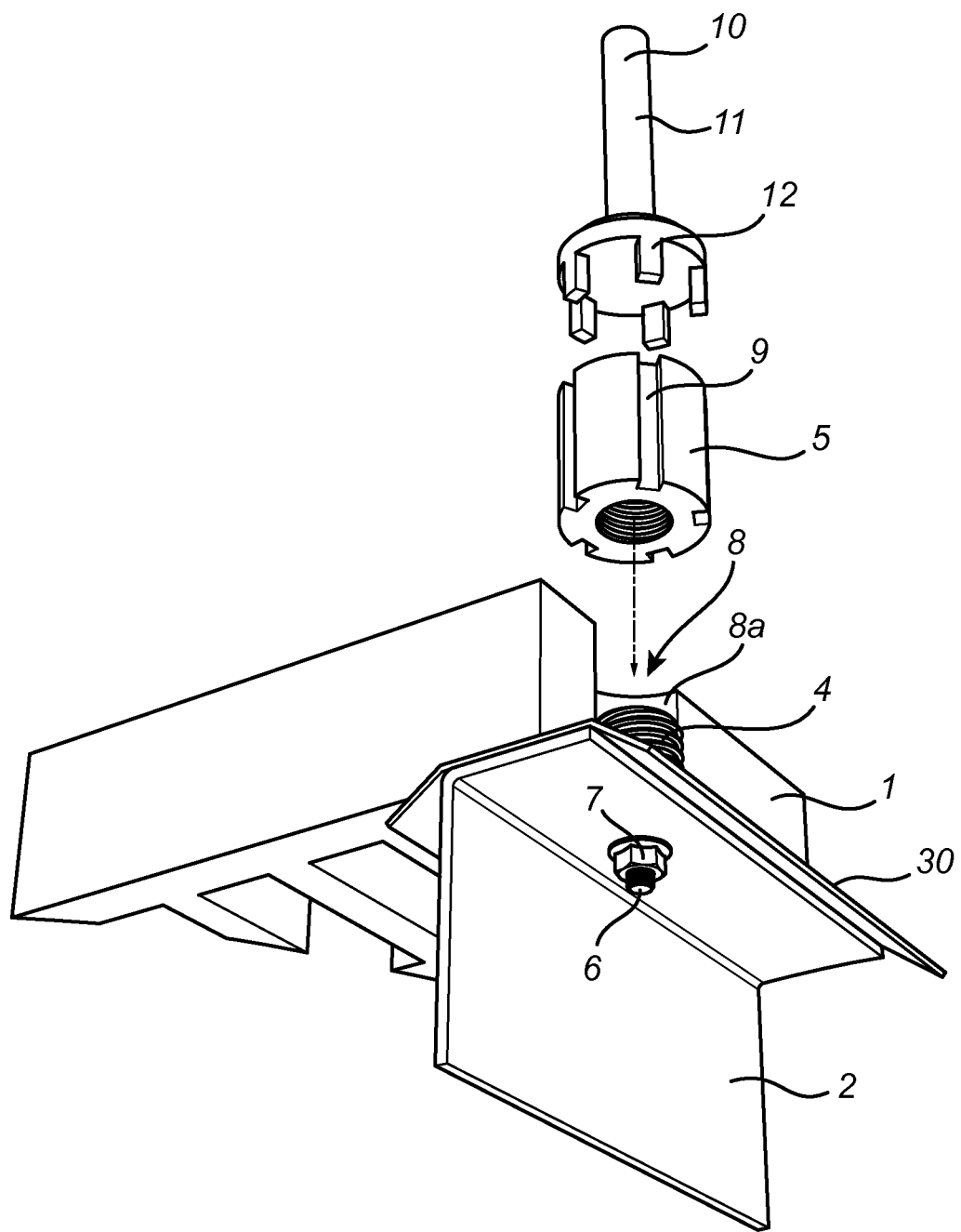
Figure 3D:
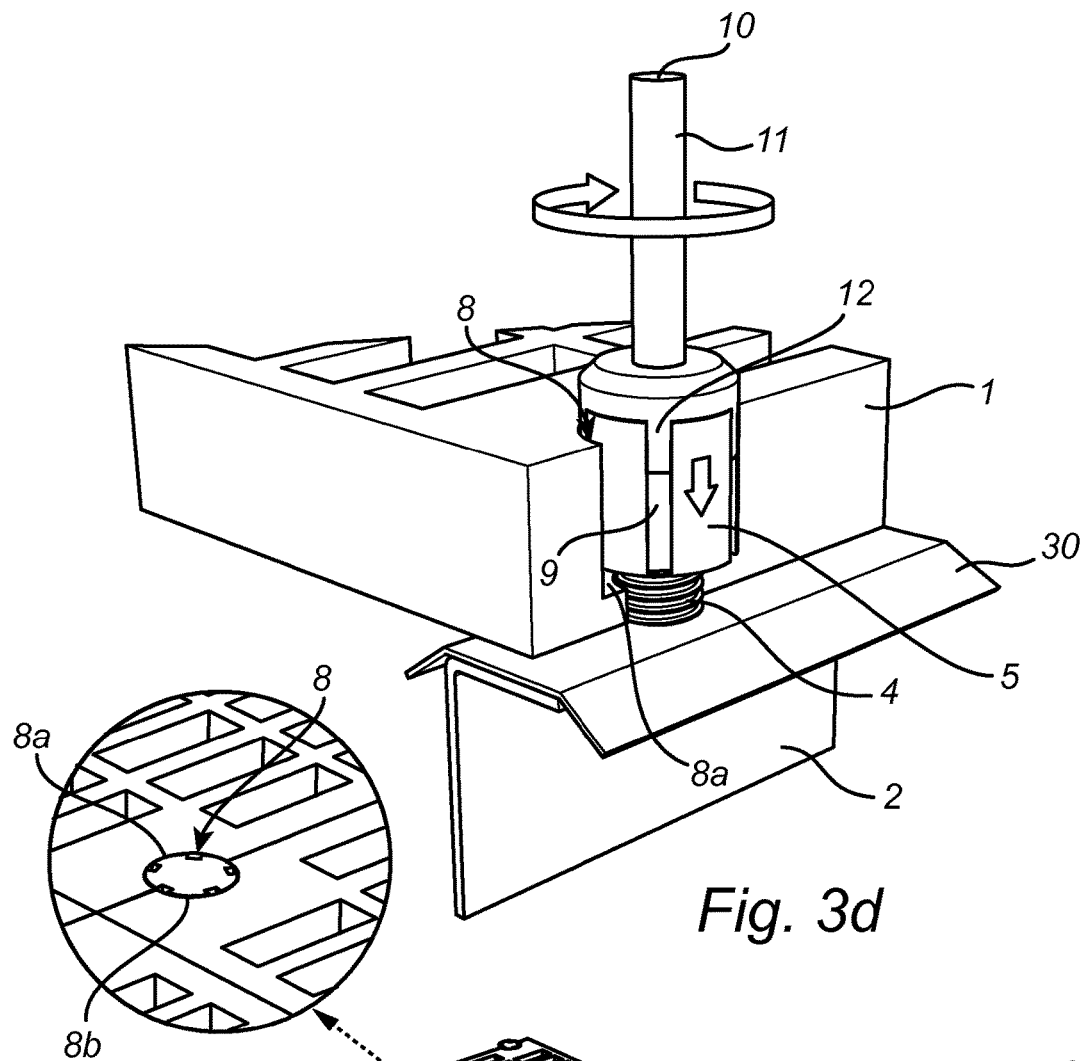

FIGS. 1a and 1b illustrate different parts included in a device that is used to fasten screening modules 1 to a screen panel support 2 in a screen 3 according to one exemplary embodiment of the invention. The fastening device primarily includes a first element 4 and a second element 5. The first element 4 is attached to the screen panel support 2 by means of a bolt 6 and a nut 7. The first element 4 has an outer threading and is hollow so that the bolt 6 can be inserted into the same, further through the protective plate 30 and the screen panel support 2, and be attached from below to the screen panel support 2 by means of the nut 7. The first element 4 is adapted to be received in an opening 8 of the screening module 1 or an opening 8 created by adjacent screening modules 1 that are to be fastened to the screen panel support 2. The opening 8 extends through the screening module 1 or adjacent screening modules, i.e. the opening is a through hole. The opening 8 may have different dimensions at different positions as will be detailed later herein. The first element 4 is preferably manufactured by a hard, relatively rigid material such as a ceramic material, steel, or a rigid plastic material. The second element 5 is also annular and has in this embodiment an inner threading for engagement with the outer threading of the first element 4 in order to attach the screening module(s) 1 to the screen panel support 2. The second element 5 has spaced apart grooves 9 on its outer periphery and is preferably manufactured from a relatively softer material, such as a thermoplastic material or polyurethane. This material is preferably relatively more flexible than the material of the first element 4. The grooves 9 extend from the top portion of the second element 5 to the bottom portion of the second element 5 in the axial direction along its entire length. The grooves 9 are used during fastening and unfastening of the second element 5 to the first element 4, which may be done by means of a handling tool 10 (FIGS. 3c and 3d). The handling tool 10 has a shaft 11 and a bottom section that is annular and comprises spaced apart protrusions 12 on its bottom portion. The protrusions 12 are configured to correspond with the grooves 9 provided on the outer periphery of the second element 5. If the grooves 9 are clogged with material, such as fines or similar, the protrusions can push material deeper into the grooves 9 to get in contact with the grooves 9 of the second element 5. Or the grooves 9 can be cleaned out of material with a suitable tool. But in most situations the handling tool 10 can be pressed down to get sufficient grip to be able to remove second element 5. A main advantage of the present invention is that even though second element 5 is subjected to heavy wear during use, handling tool 10 can still be used to remove it. This since the grooves 9 extend the whole, or at least along a substantial part of the height of second element 5.

The second element 5 can also be made of a combination of materials which at least in part are harder than other parts. Especially an outer shell of the second element 5 can be reinforced by steel, ceramics and/or similar materials and the second element 5 can be arranged with a softer core. When the core of the second element 5 is softer than the first element 4, the second element 5 can be inserted in place by pressing it down by a suitable tool. The provision of a softer core also makes pre-threading of the second element 5 redundant. This since the outer thread of the first element 4 will be able to cut threads in the second element 5 as they are interconnected.

Figure 2:
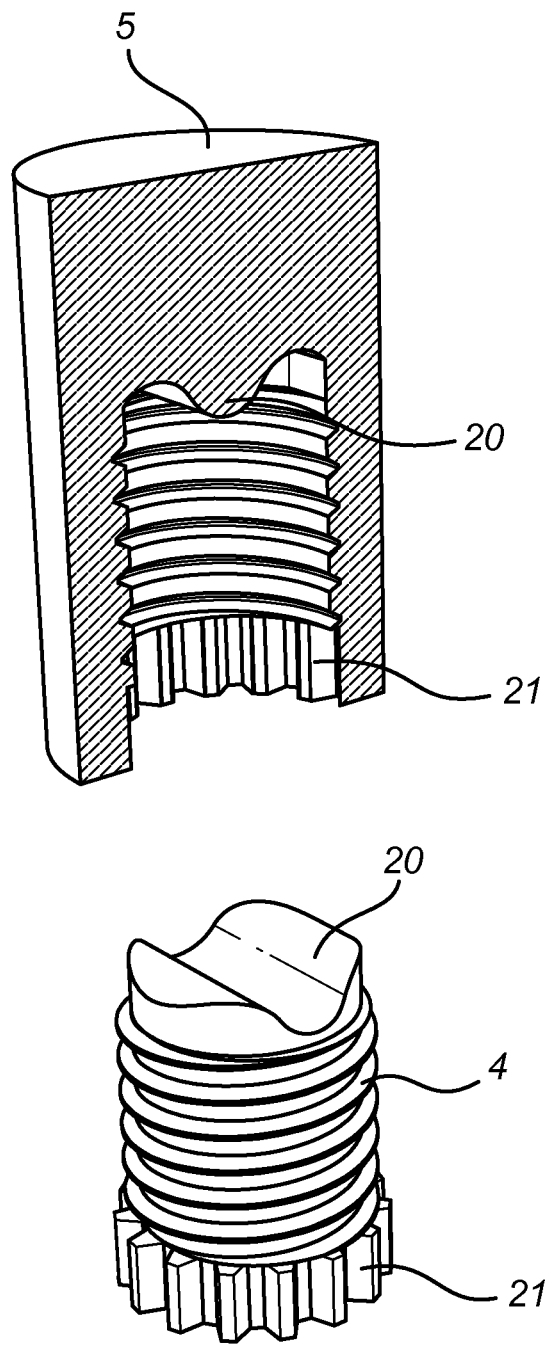
FIG. 2 is a perspective view of the device according to another embodiment of the invention.

FIG. 2 illustrates the first element 4 and the second element 5 according to another embodiment. In addition to the outer threading, the first element 4 has tap means 20 in its top portion and teeth 21 in is bottom portion. The second element 5 has corresponding tap means 20 in the top portion of its inner cavity and teeth 21 in the bottom portion of its inner cavity. When the second element 5 is fully screwed onto the first element 4, the teeth 21 of the first element 4 will engage with the teeth 21 of the second element 5, and the tap means 20 of the first element 4 will engage with the tap means 20 of the second element 5, and thus act as locking means against unintentional release of the second element 5 from the first element 4. This is possible, despite the threaded connection between the two elements 4, 5 since the second element 5 is made of a softer material that will deform in relation to the shape of the first element 4. It should be noted that it is not necessary to provide both locking means. It will typically be sufficient to arrange either the tap means 20 or teeth 21 to the first and second elements 4, 5. Similar to the previous embodiment, if the second element has a softer core pre-threading of the second element 5 redundant. This since the outer thread of the first element 4 will be able to cut threads in the second element 5 as they are interconnected.

FIG. 3a-3d illustrates a sequence of steps for fastening the screening module(s) 1 to the screen panel support 2 in the screen 3 according to one exemplary fastening method.

As a first step (FIG. 3a), the first element 4 is attached to the screen panel support 2 by means of the bolt 6 and nut 7. The first element 4 is hollow with a flange provided in the bottom section, which the head of the bolt 6 bear against upon mounting to the screen panel support 2. Between first element 4 and screen panel support 2, a protective plate 30 is arranged. Since no screening modules are yet arranged on the rails, personnel have free access to the underside of the rails. Prior art solutions exist where the screening modules or screening panel is attached to the rails by bolt and nut which is very complicated since it is hard to gain access to the underside of the rails in the very confined spaces that are available in screening equipment. Instead of using a separate bolt 6, it is also possible to provide the first element with a threaded protrusion at a lower end thereof with which the first element 4 can be attached to the screen panel support 2 by a nut 7.

Thereafter, as a second step (FIG. 3b), the screening module 1 to be fastened to the screen panel support 2 is placed on top of the protective plate 30 so that the opening 8 of the screening module(s) 1 surrounds the first element 4.

Finally, as a third step (FIGS. 3c and 3d), the second element 5 is screwed onto the first element 4 so that the second element 5 engages in threaded connection with the outer threading of the first element 4. The handling tool 10 is used to rotate the second element 5 by engaging the protrusions 12 of the handling tool 10 with the grooves 9 of the second element 5 and thereafter rotate the shaft 11 of the handling tool 10. When the second element 5 is completely screwed onto the first element 4, the top portion of the second element 5 is preferably aligned with the top surface of the screening module 1.

Figure 3E:
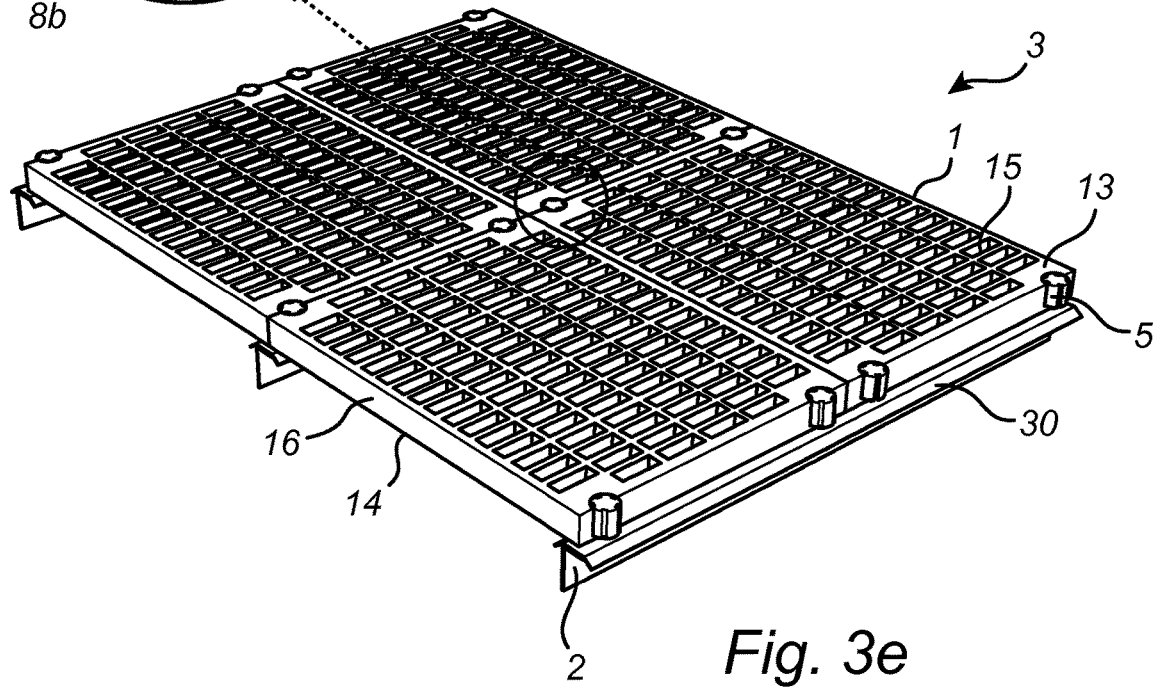
FIG. 3e is a perspective view of the screen according to one exemplary embodiment of the invention.

FIG. 3e illustrates the screen 3 according to one exemplary embodiment of the invention. The screen 3 has a screen panel support 2 and screening modules 1 fastened to the screen panel support 2 in a manner as described above. Each screening module 1 has an apertured section. The apertured section, or membrane, has a first surface 13 intended to receive and carry material to be screened, a second surface 14 opposite the first surface 13, apertures 15 extending from the first surface 13 to the second surface 14, and a circumferential surface 16 connecting the first surface 13 with the second surface 14. It should be noted that even though the membrane here is indicated as having the same thickness as the circumferential surface 16, this is not necessarily always the case. The membrane may have a larger or smaller thickness, as required in specific situations. The circumference surface 16 of adjacent screening modules 1 has shapes 8a, 8b which create openings 8. These openings 8 may be circular or near-circular or slightly elliptical and are in the drawings created by two semi-openings 8a, 8b, each provided in adjacent screening modules 1. The openings 8 extends through the screening module 1 or adjacent screening modules, i.e. the openings are through holes. The openings 8 has a first circumference along one portion of its axial direction and a second circumference along another portion of its axial direction. The openings 8 can be cylindrical or conical with a release angle. The first circumference is larger than the second circumference. As an alternative, the openings 8 has one continuous circumference with a protrusion or a flange means in the bottom section which in this case will engage with the bottom portion of the second element 5 when it is fully screwed onto the first element 4. As can be seen in the drawings, each semi-opening 8a, 8b comprises a semi-flange or protrusion part which together with a corresponding semi-flange or protrusion part will form a flange of protrusion.

FIG. 3e is also illustrative for the situation that exist when the screening modules 1 are to be disassembled and the advantages that the present invention has in that respect. As one can imagine, the upper surface 13 is subjected to heavy wear during use. This since the material to be screened passes over this surface. The second element 5 is subjected to the same wear as the surface 13 and will with time be worn from the top and downwards. If one would have applied a regular screw, be it star screw or any other shape, this would quickly wear out and loosening of the second element 5 would be impossible. Since the second element 5 of the present invention has longitudinal grooves 9 extending along more or less the whole length, second element 5 can always be loosened using tool 10. Also, even though the upper surface 13 is typically clogged with fines and other particles, it certainly be possible to apply a slight downward force on the tool 10 such that the protrusions 12 catches the corresponding grooves 9 such that the second element 5 can be loosened.

Figure 4:
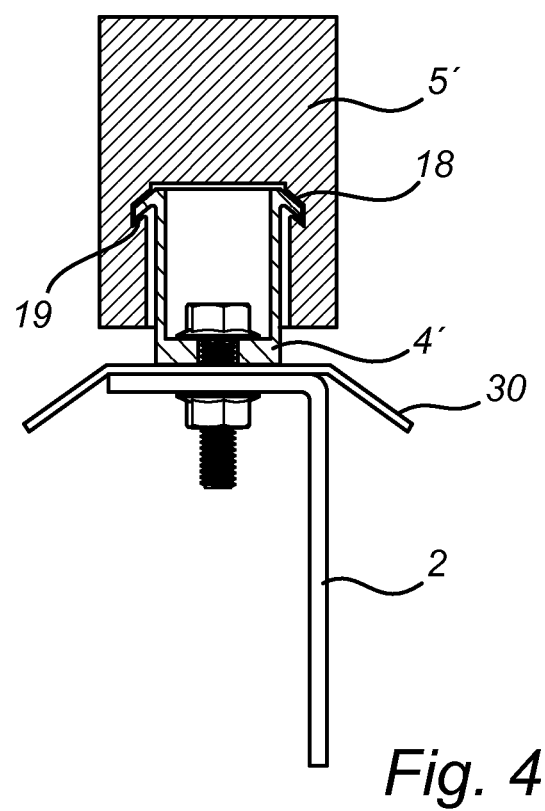
FIG. 4 is a perspective view of the device according to yet another embodiment of the invention, when attached to the screen panel support.

FIG. 4 illustrates the first element 4' and the second element 5' according to yet another embodiment of the invention, when attached to the screen panel support 1. The first element 4' is preferably attached to the screen panel support 1 in the same manner as described above for the other embodiments. The same applies for the placing of the screening module(s) 1 on top of the first element 4'. In this embodiment, however, there is no threading on the first element 4' or on the second element 5'. Instead, the two elements 4', 5' are attached to each other by means of a click function. The first element 4' has an angled flange 18 extending around at least a portion of the outer periphery of the element 4', preferably in its top section. The second element 5' has a corresponding inner groove 19 into which the flange 18 of the first element 4' is clicked when the second element 4' is placed on top of the first element 4' and forced down over the flange 18 thereby attaching the screening module 1 to the screen panel support 2.

Figure 5A:
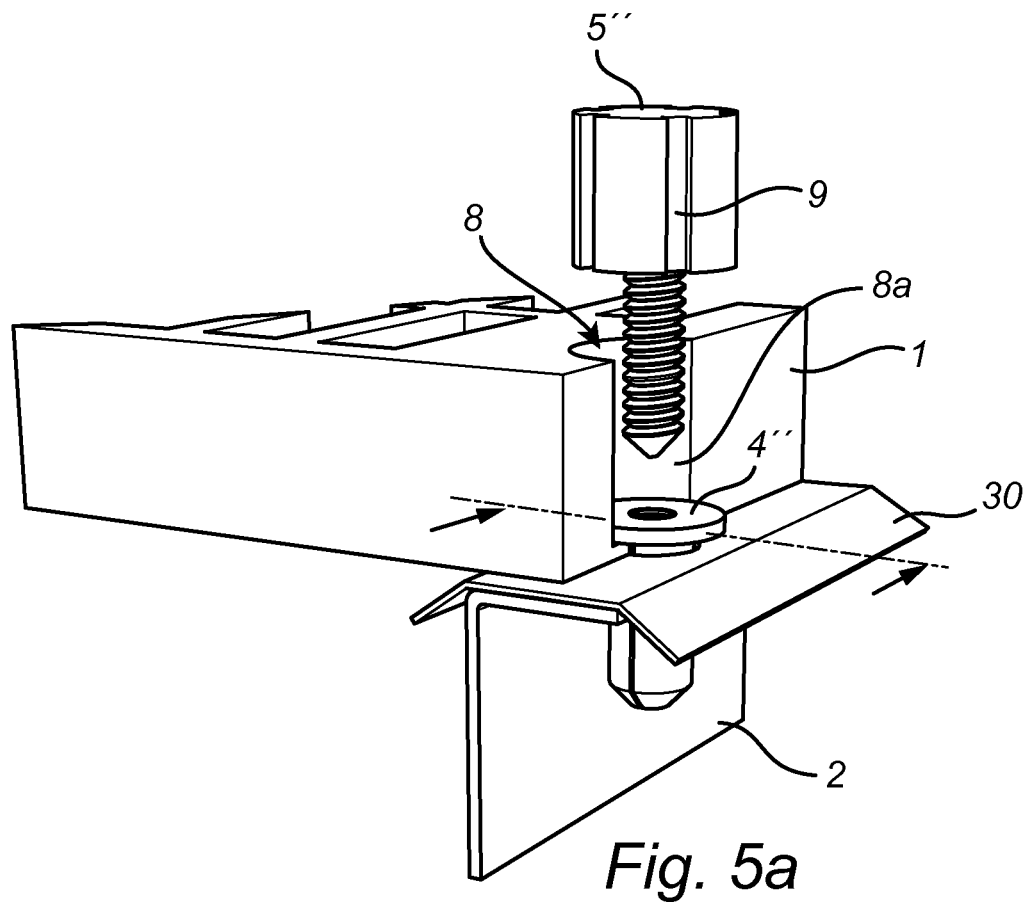
FIGS. 5a and 5b is a perspective view and a cross-section of the device according to yet another embodiment of the invention.
Figure 5B:
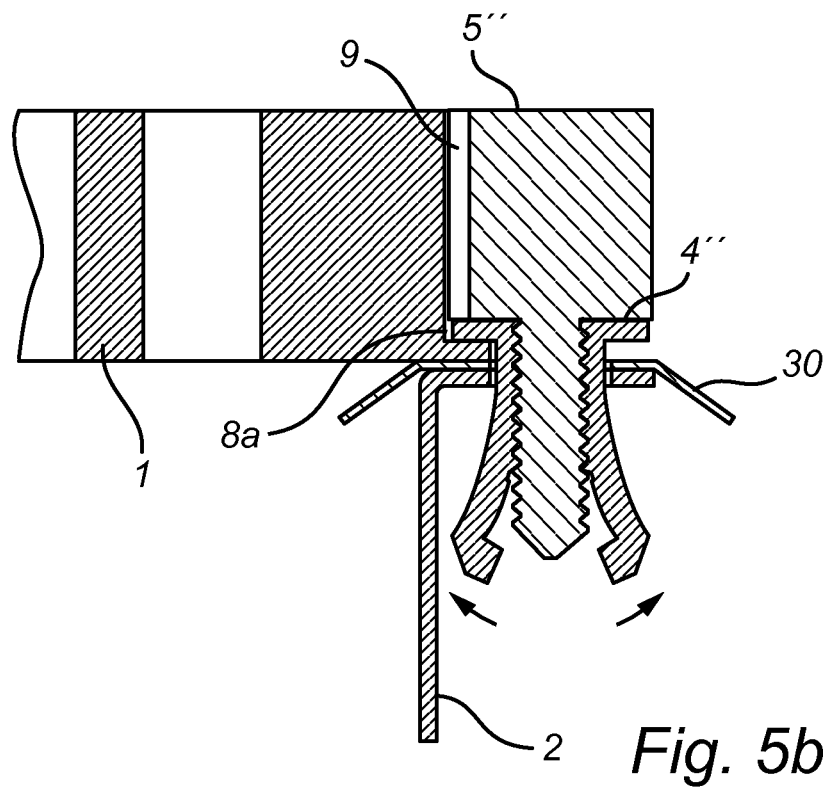

FIG. 5 illustrates the first element 4" and the second element 5" according to yet another embodiment of the invention. In this embodiment, the first element 4" is constituted by a sleeve having an inner threading extending in its axial direction. The first element 4" is preferably manufactured by a somewhat flexible or deformable material and can preferably be split into two or more parts like a gypsum plug or similar. The second element 5" is a pin-like element which has a top section containing grooves 9 for engagement with a handling tool 10 and a bottom section having an outer threading for engagement with the inner threading of the first element 4". The second element 5" is preferably manufactured by a hard, more rigid material that is strong enough to deform the relatively softer material of the first element 4". When a screening module 1 is to be attached to the screen panel support 2 it is placed on top of the screen panel support 2 and the first element 4" is placed in the opening 8 of the screening module 1 or the opening 8 created by adjacent screening modules 1. A top portion of the first element 4" will engage with a flange or similar in the bottom section of the opening 8 while the bottom portion of the first element 4" will extend through the opening 8 and into the screen panel support 2. Thereafter, the second element 5" will be screwed into the first element 4" so that the first element 4" expands in a radial direction and thus lock the screening module(s) 1 in placed in relation to the screen panel support 2.

In alternative embodiments, there is only a threading on one of the two elements 4", 5". If there is an inner threading on the first element 4", the second element 5" will be screwed into the first element 4" and deform in accordance with the inner threading of the same, thereby creating a locking interconnection between the two elements 4", 5". If there is an outer threading on the second element 5", it will be screwed into the first element 4' so that the first element 4" is deformed in accordance with the outer threading of the second element 5", thereby creating a locking interconnection between the two elements 4", 5". The choice of materials is done such that the element 4, 4", 5, 5" having threading thereon is normally harder than the element 4, 4", 5, 5" being deformed by the threading.

In another alternative embodiment, both elements 4", 5" have a threading but not in a continuous manner. Instead, the respective threading will be spaced apart in corresponding intervals in the circumferential direction of the elements 4", 5". This means that in a given mutual position of the first and second elements 4", 5" the second element 5" can move vertically downwards inside the first element 4" until it comes to a stop near the bottom of the first element 4". Then, the second element 5" is rotated such that the threaded parts of first and second element 4", 5" come into connection with each other and the second element 5" is moved further into the first element 4" and they become interlocked.

In another alternative embodiment, similar to the first embodiment, both elements 4, 5 have a threading but the threading has a barbed shape. I.e. the threads may be somewhat deeper and directed downwards, like a barb. The skilled person then has the option of threading them into position or forcing the second element 5, being of a relatively more deformable material, over the first element 4 and the barbed shape of the threads will keep them interlocked. In another embodiment, first element 4" has expanding legs and second element 5" can be pressed down inside of the first element 4" such that the expanding legs of first element 4" expands and locks the screening module 1 in place, see FIG. 5b.

The skilled person realizes that a number of modifications of the embodiments described herein are possible without departing from the scope of the invention, which is defined in the appended claims. For instance, the shape and size of the components described above may be varied in any suitable way. The first element 4 and the second element 4 may have an annular shape as well as other shapes that is suitable for their purpose. The same applies for the inner threading, the outer threading and the grooves 9. The inner and/or outer threading may be angled, causing a barbed shape thereof; one preferred angle could be approximately 45 degrees. The groove 9 may extend along the entire length of the second element 5 or along a predetermined distance of the length of the second element 5. In the embodiments described above, the groove 9 is constituted by a cavity but could instead be constituted by some sort of protrusion. In this later case, the handling tool 10 would have cavities instead of protrusions 12 on its bottom portion. Further, the second element 5 could be provided with an inner core of relatively softer material and outer part of relatively harder material. This would allow for the threads of the first element 4 to cut threads into the softer core of the second element 5 which could then be manufactured without threads. Further, ceramic inserts or similar could be provided on the outer part of the second element 5 to provide support for the protrusions 12 of the handling tool 10. Such ceramic inserts could also provide wear protection on a top surface of the second element 5.

Screen module 1 can be made in its entirety from rubber or combinations of rubber and other suitable, wear resistant materials such as polyurethane and may be reinforced by e.g. polycarbonate resin.

The skilled person also realizes that the first element 4 can be fitted on to a bar or similar that holds several of first elements 4. This is also advantageous in that the hole pattern in the support frame can differ from the hole pattern in the screening modules.

The skilled person also realizes that the first element 4 can be fitted with the top portion in the form of a flange or similar below the screening module 1, i.e. directly on the screen panel support 2. In this case it is imaginable that the flange is arranged in a recess or similar arranged either in the screen panel support 2 and/or in the underside of the screening module 1 in order to create a flush contact surface between the screening module 1 and the screen panel support 2.

The invention claimed is:

1. A screen, having a screen panel support and at least one screening module arranged in said screen panel support, wherein said screening module is fastened to said screen panel support by means of at least one device, said device comprising:
   a first element attachable to said screen panel support and adapted to be received in an opening of said screening module or an opening created by adjacent screening modules, said opening having a first circumference along one portion of its axial direction and a second circumference along another portion of its axial direction, said second circumference being smaller than said first circumference, said opening extending through said screening module or adjacent screening modules;

a second element for engagement with said first element, such that said screening module is attached to said screen panel support upon interconnection between said first element and said second element, wherein an outer periphery of said second element comprises a plurality of grooves for engagement with a handling tool.

2. The screen according to claim 1, wherein said grooves extend in an axial direction and along the entire length of said second element.

3. The screen according to claim 1, wherein said grooves extend in an axial direction and along a limited portion of the length of said second element.

4. The screen according to claim 3, wherein said second element is provided with an external thread arranged to engage with the first element.

5. The screen according to claim 1, wherein said first element is hollow and adapted to receive a bolt for attachment to said screen panel support by means of said bolt and a nut.

6. The screen according to claim 1, wherein said first element is manufactured by a material chosen from the group consisting of ceramic material, steel, or plastic.

7. The screen according to claim 1, wherein said second element is manufactured by a thermoplastic material or a polyurethane or combinations thereof.

8. The screen according to claim 1, wherein said second element comprises a core and an outer shell, wherein the core is relatively softer than the outer shell.

9. The screen according to claim 8, wherein a threading of said first element is arranged to cut into said core of the second element when said second element is threaded onto the first element.

10. The screen according to claim 1, wherein said second element is provided with an external thread arranged to engage with the first element.

11. The screen according to claim 1, wherein said first element and said second element comprises corresponding locking means.

12. The screen according to claim 1, wherein a circumference surface of adjacent screening modules have shapes which create at least one opening, said at least one opening having a first circumference along one portion of its axial direction and a second circumference along another portion of its axial direction, said second circumference being smaller than said first circumference.

13. The screen according to claim 12, wherein the portion of said at least one opening with said first circumference is adapted to receive said first element and second element, and the portion of said at least one opening with said second circumference is adapted to receive said first element only.

14. The screen according to claim 12, wherein an inner periphery of said at least one opening comprises a protrusion for engagement with the outer periphery and/or the bottom portion of said second element.

15. A method for fastening screening modules to a screen panel support, comprising:

attaching a first element to said screen panel support;

placing an opening of a screening module or an opening created by adjacent screening modules around said first element, said opening having a first circumference along one portion and a second circumference along another portion of its axial direction, said opening extending through said screening module or adjacent screening modules; and engaging a second element with said first element by engaging a handling tool with at least one groove provided on an outer periphery of said second element, and creating a screwing motion of said second element, wherein said second element having a larger outer circumference than said second circumference of said opening, thereby attaching said screening module or screening modules to said screen panel support.

* * * * *